(12) United States Patent
Neubrand

(10) Patent No.: US 6,283,532 B1
(45) Date of Patent: Sep. 4, 2001

(54) CONVERTIBLE TOP HAVING A BACK LITE FORMING PART OF A TONNEAU COVER

(75) Inventor: Frank G. Neubrand, West Bloomfield, MI (US)

(73) Assignee: CTS Fahrzeug Dachsysteme GmbH, Rochester Hills, MI (US)

( * ) Notice: Subject to any disclaimer, the term of this patent is extended or adjusted under 35 U.S.C. 154(b) by 0 days.

(21) Appl. No.: 09/779,887

(22) Filed: Feb. 8, 2001

Related U.S. Application Data

(60) Provisional application No. 60/244,518, filed on Oct. 31, 2000.

(51) Int. Cl.[7] .......................................................... B60J 7/00
(52) U.S. Cl. .................................. 296/107.07; 296/146.14
(58) Field of Search .............................. 296/136, 107.08, 296/146.14, 107.07

(56) References Cited

U.S. PATENT DOCUMENTS

| | | |
|---|---|---|
| 4,741,571 | 5/1988 | Godette . |
| 5,209,544 | 5/1993 | Benedetto et al. . |
| 5,246,262 | 9/1993 | Schrader et al. . |
| 5,769,483 | 6/1998 | Danzl et al. . |
| 5,788,316 | 8/1998 | Rothe . |
| 6,019,416 | 2/2000 | Beierl . |
| 6,123,381 | 9/2000 | Schenk . |
| 6,123,382 | 9/2000 | Lorenz . |

*Primary Examiner*—Joseph D. Pape
(74) *Attorney, Agent, or Firm*—Brooks & Kushman P.C.

(57) ABSTRACT

A convertible top for a vehicle having a back lite that is moved to form a tonneau cover over the convertible top when stored. The convertible top is moved by a top stack linkage that includes back lite control links. The back lite is initially moved to provide clearance for the bows of the convertible top to be folded underneath the back lite.

6 Claims, 3 Drawing Sheets

CONVERTIBLE TOP HAVING A BACK LITE FORMING PART OF A TONNEAU COVER

CROSS-REFERENCE TO RELATED APPLICATIONS

This application claims the benefit of U.S. provisional application Ser. No. 60/244,518, filed Oct. 31, 2000.

TECHNICAL FIELD

The present invention relates to a convertible top for a vehicle.

BACKGROUND ART

Convertible tops are popular options on vehicles. A convertible top forms the roof over the passenger compartment when it is extended and is retracted into a storage compartment behind the passenger compartment of the vehicle. Soft top convertible tops have a plurality of bows supported by a top stack linkage. The top stack and bows are covered by a flexible cover.

Convertible tops generally have a back lite that may be formed of glass or transparent plastic that permit occupants of the vehicle to see through the rear portion of the convertible top. Some convertible tops have soft back lites that fold with the top but this type of back lite is easily scratched that causes a loss of transparency. For this reason, rigid glass or plastic back lites are generally preferred even though they are difficult to incorporate in the kinematic of a convertible top.

Many convertible top systems also include a tonneau cover for covering the convertible top when it is in its stored position. Tonneau covers may take many different forms. One form of a tonneau cover is a flexible canvas cover that is connected by snaps around the perimeter of the storage compartment in which the convertible top is stored when retracted. Flexible, snap-on canvas tonneau covers are inconvenient to attach and remove.

Another type of tonneau cover is a rigid tonneau cover panel that is linked to the vehicle and is either power driven or is manually operated. A disadvantage associated with a rigid tonneau cover is that it adds weight to the vehicle, particularly if it has an independent drive system.

What is needed is a simple and effective automatic tonneau cover wherein the back lite of the convertible top also functions as a tonneau cover. The back lite may form the entire tonneau cover or only a portion of the tonneau cover. If the back lite panel forms only a portion of the tonneau cover, additional retractable panels may be used to cover other portions of the retracted convertible top.

DISCLOSURE OF INVENTION

According to one aspect of the present invention, a convertible top is provided that has a back lite that is lifted by the top stack linkage to allow the other portions of the top to be folded under the back lite into a retracted position of the convertible top. After the other portions of the top stack and the convertible top cover are folded into the convertible top storage compartment, the back lite is folded down over the top of the retracted convertible top to function as all or part of the tonneau cover.

According to the invention, a convertible top is provided for a vehicle having a passenger compartment and a storage area for storing the top. A top stack linkage is moveable between an extended position and a retracted position. The top stack linkage has a plurality of bows that extend transversely between a right side and a left side of the top stack linkage. The bows define a roof line of the vehicle when the top stack linkage is in the extended position. A flexible cover is secured to the top stack linkage that encloses the passenger compartment when the top stack linkage is extended and is stored in the storage area when the top stack linkage is retracted. According to the invention, a relatively rigid back lite spans an opening in the flexible cover when the top stack linkage is extended. The back lite is connected to a back lite control link that is also connected to the top stack linkage. Upon moving the top stack linkage from the extended position to the retracted position, the back lite control link shifts the back lite to permit at least some of the bows to pass below the back lite. The back lite is positioned over at least some of the bows when the top stack linkage is in its retracted position.

According to another aspect of the invention, the top stack linkage is connected to the vehicle at a main pivot bracket. The back lite control link is formed in first and second parts that are connected by a pivot. The first part of the back lite control link is connected to the main pivot bracket while the second part of the back lite control link is connected to the back lite.

According to yet another aspect of the present invention, the plurality of bows includes a first bow that is detachably secured to the windshield header when the top stack is extended. A second bow is provided rearward of the first bow. A third bow is located rearward of the second bow and a fourth bow is located rearward of the third bow. The back lite is rearward of the fourth bow when the top stack is extended. A rear portion of the convertible top cover is secured to the vehicle on the opposite side of the back lite from the fourth bow.

According to another aspect of the invention, the cover may be secured to the first bow and second bow but not secured to the third and fourth bows so that the back lite may move while remaining attached to the cover as the third and fourth bows move relative to the cover to permit them to move below the back lite.

According to another aspect of the invention, the back lite is preferably maintained in a generally rearwardly facing angular orientation when the top stack is extended. The back lite is maintained in a generally horizontal orientation when the top stack is in the retracted position and is disposed over one or more of the bows as previously described.

According to another aspect of the invention, a four bar link may be provided that pivots at one point on the main pivot bracket and has one leg that is formed by part of the back lite control link. The four bar link connects the back lite control link to the top stack linkage to be operative to control movement of the back lite as the top stack linkage is extended and retracted.

These and other aspects and advantages of the present invention will be better understood in view of the attached drawings and following detailed description of a preferred embodiment of the invention.

BEST MODE FOR CARRYING OUT THE INVENTION

Figure 1:
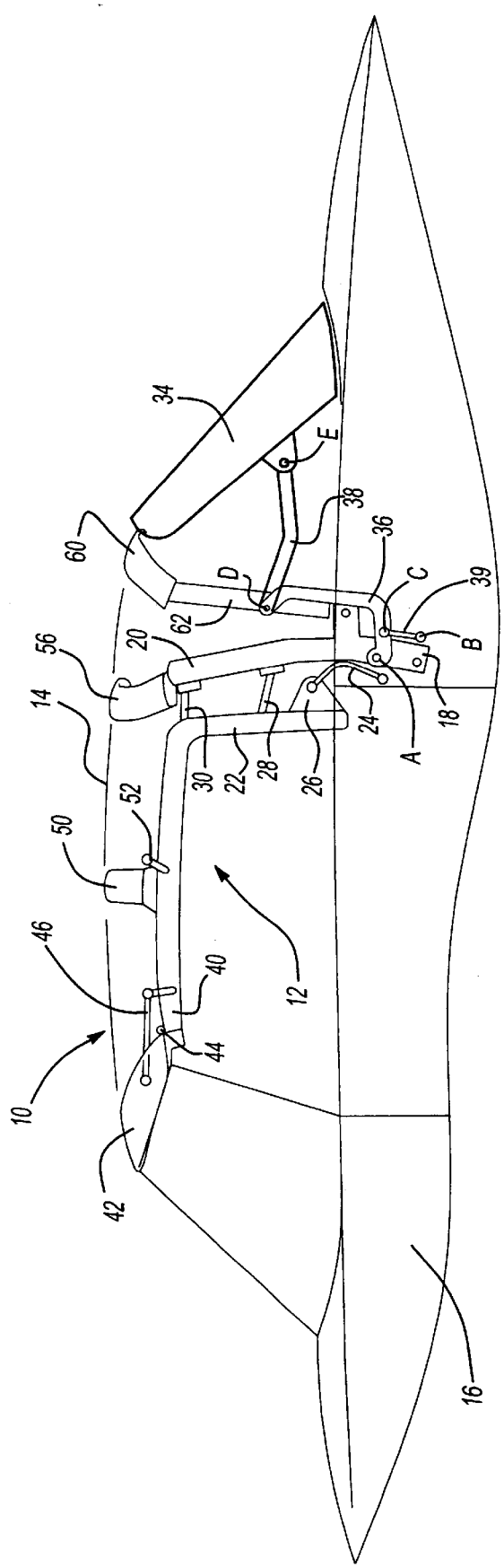
FIG. 1 is a side elevation view of a top made in accordance with the present invention in the top up position.

Referring now to FIG. 1, the convertible top 10 is shown in its deployed, or extended, position. The convertible top 10 includes a top stack linkage generally referred to by reference numeral 12 and a cover 14. The top stack linkage 12 is connected to the body 16 of a vehicle by a main pivot bracket 18. It should be understood that the drawings illustrate the left side of a convertible top 10 and that the right side of the convertible top 10 is a mirror image of the left side illustrated.

The main pivot bracket 18 supports a rear rail 20. A side rail 22 is connected to and supported by the rear rail 20. A dog leg link 24 connects the main pivot bracket 18 to a flange 26. The flange 26 is secured to the side rail 22. First and second hinged links 28 and 30 connect the side rail by means of a multiple axis pivot, such as a ball joint, to the rear rail 20.

A back lite 34 is connected by first and second back lite control links 36 and 38 to the main pivot bracket 18. Back lite control link 36 is connected at pivot A to the rear rail 20. A cylinder 39 is connected between pivots B and C on the main pivot bracket 18 and back lite control link 36 to drive the top between its open and closed positions. As the side rail 22 moves toward its retracted position, it may be pivoted inboard. First and second back lite control links 36 and 38 are pivotally connected at pivot D. Second back lite control link 38 is pivotally connected at pivot E to the back lite 34.

The front end 40 of the side rail 22 is connected to the one bow 42. One bow 42 is connected to the side rail 22 by means of a short link or pivot connector 44 and an articulated link 46. A two bow 50 is connected by a side rail pivot connector 52 to the side rail 22. A three bow 56 is connected by a rear rail pivot connector (not shown) to the rear rail 20. A four bow 60 is pivotally connected to a support link 62.

Figure 2:
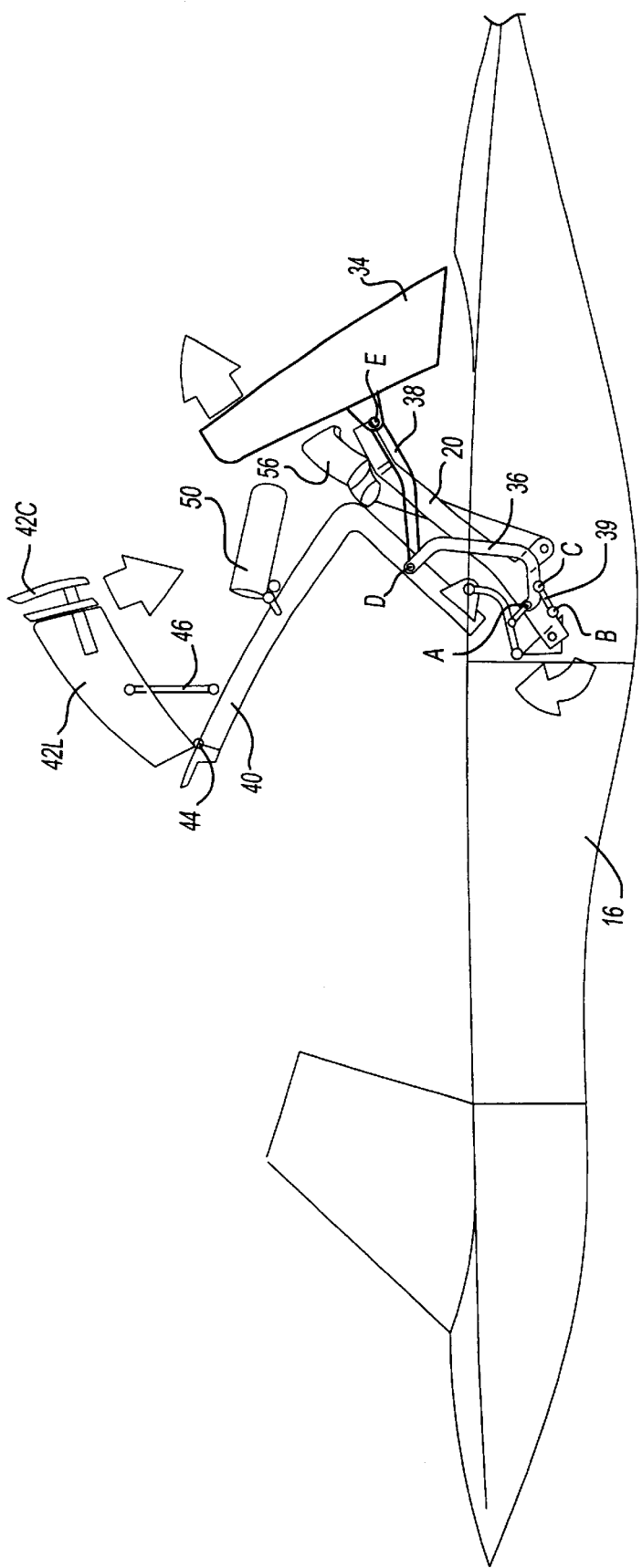
FIG. 2 is a side elevation view of the convertible top of the present invention in a mid-cycle position.

Referring now to FIG. 2, the top stack linkage 12 is shown at an intermediate point in the retraction process. The first and second back lite control links 36 and 38 are both connected at pivot point D. The first back lite control link 36 is connected to pivot point A that is located on the rear rail 20. The back lite is moved by the back lite control links 36 and 38 upwardly and rearwardly to allow the top stack to fold beneath the back lite 34.

During the top stack retraction cycle, the front end 40 of the side rail 22 and pivot link 44 pivot inwardly toward the centerline of the vehicle. The one bow 42 is formed in at least three segments. A center segment 42C and left segment 42L are shown in FIG. 2. The center segment 42C and left segment 42L is initially pivoted to a Z position relative to the side rail 22. Left segment 42L is connected by a short link 44 and articulated link 46 to the side rail 22. The right side folds in like manner as a mirror image of the left side.

Figure 3:
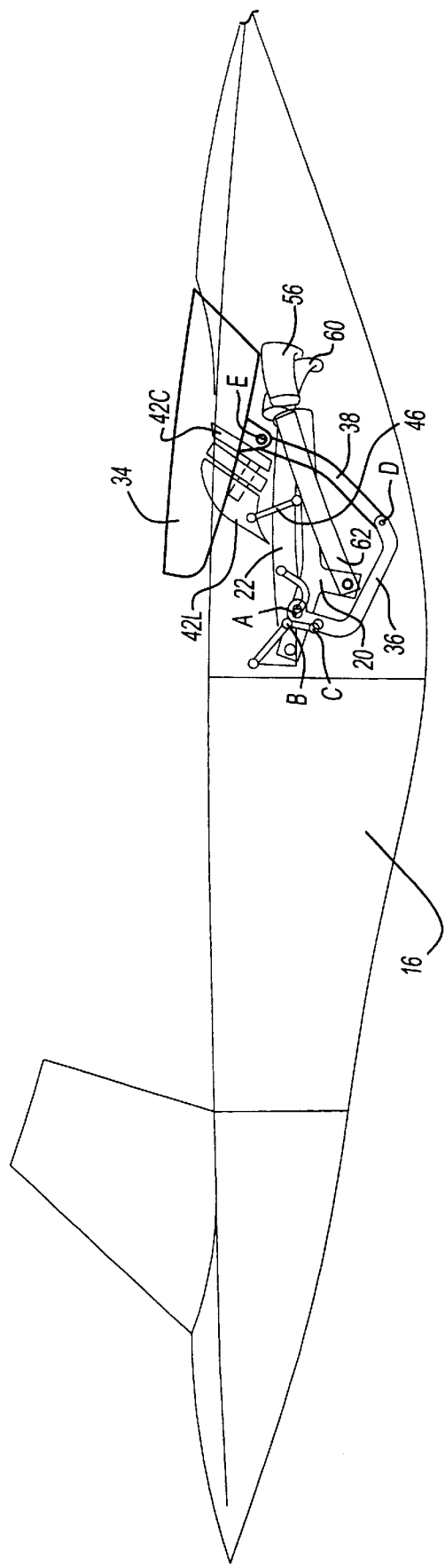
FIG. 3 is a side elevation view of the convertible top of the present invention in the retracted position.

After the back lite 34 is lifted away from the top stack linkage 12, it is pulled down to a covering position over the retracted top stack linkage 12, as shown in FIG. 3. The first and second back lite control links 36 and 38 pull the back lite tonneau cover 34 down and in a generally forward direction to the covering position.

Referring now to FIG. 3, the top stack linkage 12 is completely retracted, the side rails 22 are folded inwardly and extend generally transversely across the vehicle. The back lite 34 is in a generally horizontal orientation and disposed over the one bow 42 that includes 42L and 42C. The back lite 34 is pulled down over the retracted bows 42, 50, 56, and 60 and provides a protective and decorative cover over the stored convertible top. The rear rail 20 and support link 62 are pivoted rearwardly into a horizontal orientation below the back lite 34.

Additional partial tonneau cover panels (not shown) may be provided to cover some parts of the top stack linkage in conjunction with the back lite/tonneau cover 34 that covers a substantial portion of the stored convertible top.

The embodiment described above is powered by providing a cylinder, a motor, or another prime mover between the top stack linkage 12 and the body of the vehicle. Another way of providing a power convertible top would be to connect a hydraulic cylinder between the rear rail 20 and the vehicle body that can be extended and retracted to operate the top stack linkage 12. The invention is also applicable to a manually operated convertible top 10.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A convertible top for a vehicle having a passenger compartment and a storage area comprising:

a top stack linkage which is moveable between an extended position and a retracted position, the top stack linkage has a plurality of bows that extend transversely between a right side and a left side of the top stack linkage, the bows define a roof line of the vehicle when the top stack linkage is in the extended position;

a flexible cover is secured to the top stack linkage for enclosing the passenger compartment when the top stack linkage is extended and is stored with the top stack linkage in the storage area when the top stack linkage is retracted; and a back lite spanning an opening in the flexible cover, the back lite being connected to a back lite control link, the back lite control link also being connected to the top stack linkage, wherein moving the top stack linkage from the extended position to the retracted position causes the back lite control link to shift the back lite to permit at least some of the bows to pass below the back lite, the back lite being positioned over at least some of the bows when the top stack linkage is in the retracted position.

2. The convertible top of claim 1 wherein the top stack linkage is connectable to the vehicle by a main pivot bracket and the back lite control link is formed as first and second parts that are connected by a pivot, the first part being connected to the main pivot bracket, the second part being connected to the back lite.

3. The convertible top of claim 1 wherein the plurality of bows includes a first bow that is detachably securable to the windshield header when the top stack is extended, a second bow that is rearward of the first bow, a third bow that is rearward of the second bow and a fourth bow that is rearward of the third bow, the back lite being rearward of the fourth bow when the top stack is extended.

4. The convertible top of claim 3 wherein the cover is secured to the first bow and second bow, but is not secured to the third bow and fourth bow, wherein the back lite moves with the cover as the third bow and fourth bow are moved relative to the cover to permit them to move below the back lite.

5. The convertible top of claim 1 wherein the back lite is maintained in a generally rearwardly facing angular orientation when the top stack is extended and wherein the back lite is held in a generally horizontal orientation when the top stack is in the retracted position.

6. The convertible top of claim 1 wherein a four bar link is provided that pivots at one point on a main pivot bracket and wherein one leg of the four bar link is formed by the back lite control link.

* * * * *